UNITED STATES PATENT OFFICE.

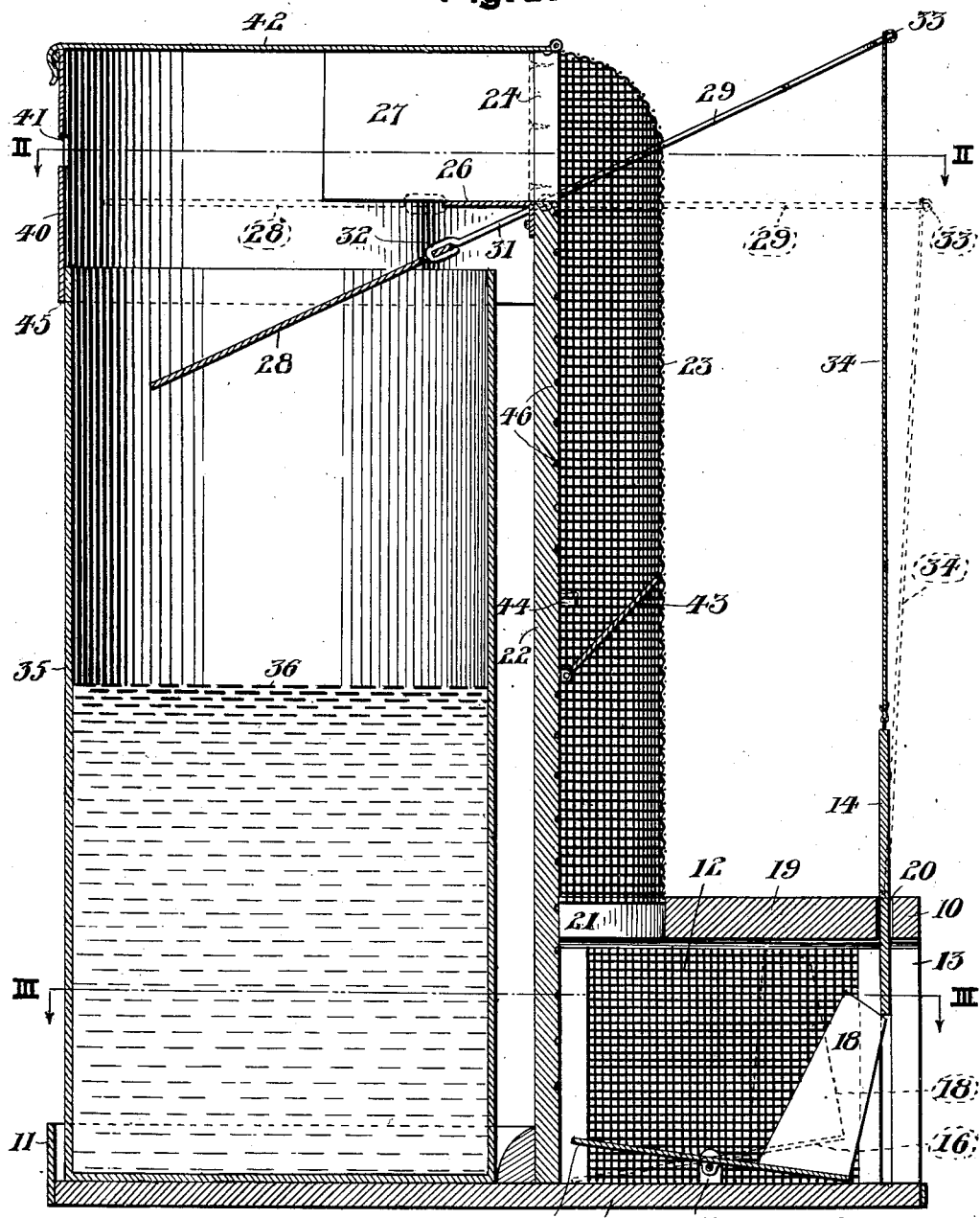

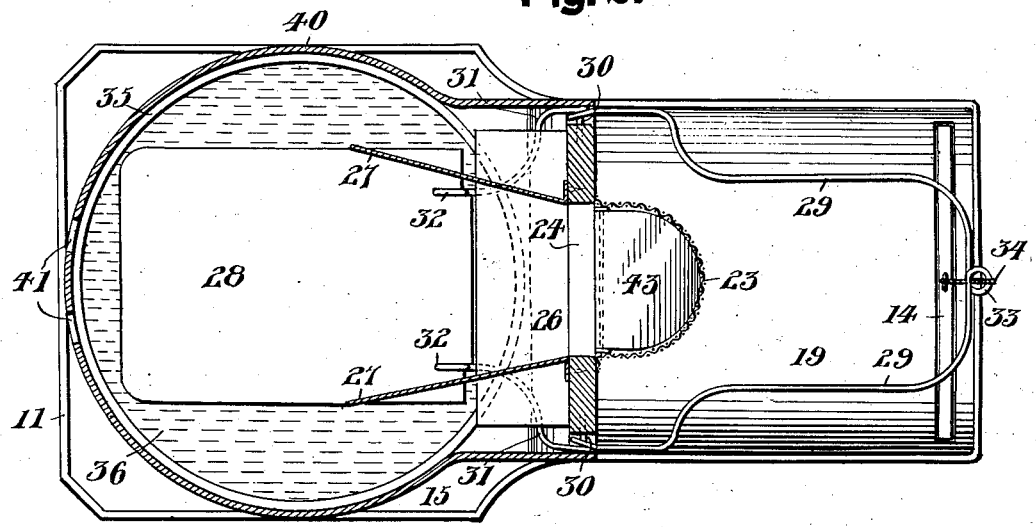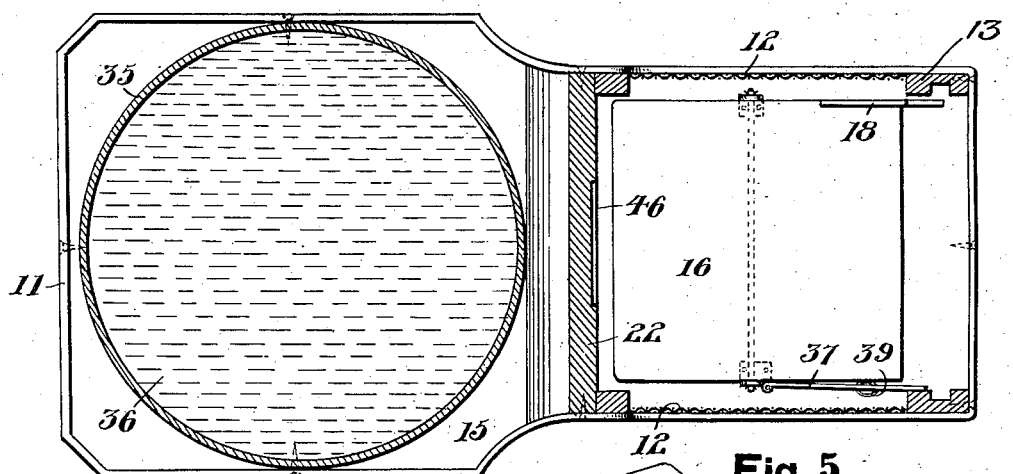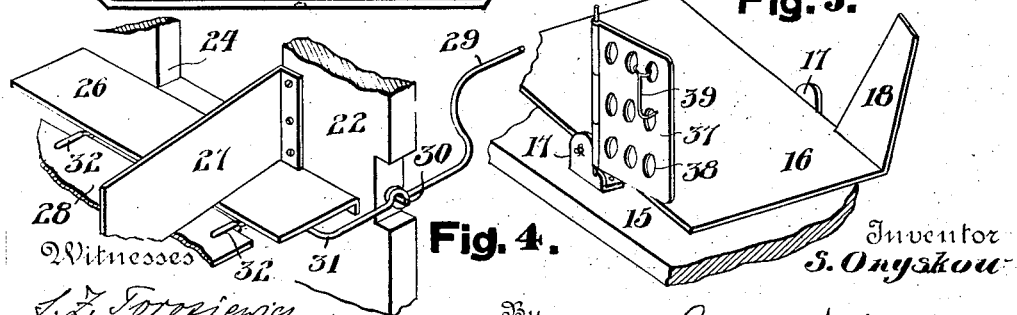

SILVESTER ONYSKOW, OF JENKINS, KENTUCKY, ASSIGNOR OF ONE-HALF TO PETER GODLESKY, OF JENKINS, KENTUCKY.

RAT-TRAP.

1,131,000.      Specification of Letters Patent.      Patented Mar. 9, 1915.

Application filed July 30, 1914. Serial No. 854,164.

*To all whom it may concern:*

Be it known that I, SILVESTER ONYSKOW, a subject of the Emperor of Germany, residing at Jenkins, in the county of Letcher and State of Kentucky, have invented certain new and useful Improvements in Rat-Traps, of which the following is a specification.

This invention relates to new and useful improvements in traps and more especially to mouse and rat traps.

The primary object of this invention is to provide a self-setting trap in which the animal which is caught is precipitated into a receptacle containing liquid for final extermination by drowning.

A further object of the invention is to provide a trap in which the entering of the animal closes the same against exit while upon traveling through a passage the weight of the animal resets the trap, the animal then falling into the drowning liquid from the resetting mechanism.

A still further object is to provide a trap that is inexpensive and easy to manufacture, but that securely retains the animal after entering the same, and further provides a separate means of killing the animal by drowning, and has an automatic resetting mechanism actuated by the animal's weight.

In the drawings forming a part of this application and in which like designating characters refer to corresponding parts throughout the several views, Figure 1 is a central vertical sectional view, taken through the trap, when the same is in its set position. Fig. 2 is a horizontal transverse sectional view taken upon II—II of Fig. 1. Fig. 3 is a horizontal transverse sectional view taken upon III—III of Fig. 1. Fig. 4 is a fragmentary detail view of the resetting trip hinge connection and the adjacent elements shown upon an enlarged scale, and, Fig. 5 is an enlarged detail perspective view of a portion of the locking trip mechanism and the bait carrier and a portion of the base.

Referring more in detail to the drawings, it will be noted that the same broadly consists in providing two casings the smaller of which designated 10 constitutes the animal-catching portion of the device, while the larger casing 11 contains the killing device.

The casing 10 has opposite reticulate sides 12 which are forwardly provided with opposite slotted ways 13 adapted for slidably receiving the front wall or drop door 14 therein.

The bottom 15 serves for the two casings 10 and 11 and has an automatic trip board 16 hinged to the brackets 17 mounted on the floor and within the casing 10, said trip board being provided at one edge with an upwardly extending lock arm 18 adapted to project beneath the lower edge of the drop door when open in its elevated position and the trip board is tilted forwardly as shown in Fig. 1.

The casing 10 is provided with a top 19 having a forward slot 20 therethrough for the accommodation of the drop door 14 and is also provided rearwardly with a curved cutaway opening 21 communicating with a vertically positioned passageway formed upon the adjacent side 22 of the casing 11 by the reticulate wall 23 and leading from the outlet opening 21 of the casing 10 to the inlet opening 24 of the casing 11.

The inlet opening 24 is positioned through the top of the side 22 while a bracket 26 is positioned within the casing 11 below the opening 24 and provides a platform for receiving the animal while opposite flaring sides 27 for directing the travel of the animal onto a tilting platform 28 are positioned thereabove. The said platform 28 is supported by a bail-shaped arm 29 trunnioned as at 30 upon the wall 22 and having its opposite inner ends 31 secured as at 32 to the platform 28. The outer end of the bail 29 is provided with a ring 33 to which one end of the cord 34 is secured while the other end thereof is secured to the top of the drop door 14.

The tank 35 is removably positioned within the casing 11 and directly beneath the platform 26 and 28, and whereby as will be evident an animal entering upon the platform 26 and stepping upon the platform 28 will by reason of the weight of the animal tilt downwardly the platform 28, thus precipitating the animal into the fluid 36 which is contained in the tank 35 and designed for the purpose of drowning the animals that are caught by the trap.

It will be noted that the trip board 16 is provided with a swinging bait holder 37 upon the edge thereof opposite to the lock arm 18 and said holder is provided with a plurality of perforations 38 and with a swinging hook 39 for securing bait to the holder.

The upper portion 30 of the casing 11 is in the form of a strap and is provided with a plurality of perforations 41 at its outer side in alinement with the opening 24 for admitting light to the platform 28. The casing 11 is provided with a hinged cover or lid 42 for preventing the escape of the animal while the side 22 is provided with an upwardly inclined hinged plate 43 which opens during the upward movement of the animal and automatically closes after the animal has passed the plate while the plate prevents the return of the animal downwardly to the casing 10. A post 44 upon the outer face of the wall 22 and rearwardly of the plate 43 insures the automatic return of the plate to its closed position by reason of its own weight.

The bait holder 37 is adapted to swing inwardly above the trip board 16 for the purpose of receiving bait upon the hook 39 and is then swung outwardly against the adjacent side of the casing 10 to position the bait between the holder 37 and the casing side, thereby preventing the animal from procuring the bait after entering the trap. It will be noted that the wall 22 within the passage 23 is provided with transverse grooves or steps 46 for affording assistance to the animal in climbing upwardly to the opening 24.

The complete operation of the device will be apparent from the present description in that with the tank 35 partially filled with liquid 36 and positioned within the casing 11 beneath the tilting platform 28 and the rigid platform 26, the elements being positioned as shown in Fig. 1, the entering of an animal into the casing 19 and beneath the drop door 14 thereof and upon the trip board 16 actuates the forward portion of said board and moves its arm 18 upwardly when the animal reaches the rear portion of the board, which by reason of the weight of the animal tilts downwardly. This movement of the lock arm 18 releases the door 14 which drops of its own weight and closes the entrance to the casing 19 while at the same time elevating the platform 28 to a horizontal position by means of the connecting cord 34 and arm 29. The animal having been enticed into the case 19 by the bait upon the holder 37 is thus prevented from escaping and passes upwardly through the passage 23 elevating bail 43 and passing by the same and through the opening 24 to a position upon the platform 26. The platform 28 lying in substantially horizontal alinement with said platform 26, and the openings 41 being in alinement with the entrance opening 24, the animal steps upon the platform 28 and the weight of the animal tilts said platform downwardly whereupon the animal falls into the liquid 36, and is drowned or retained therein until the tank 35 is removed from the casing 11 by removing the same out of the cutaway portion 35 thereof. The tilting of the platform 28 draws upwardly the door 14 of the casing 19 by reason of the connecting arm 29 and cord 34 and allows the lock arm 18 to pass beneath said door and upon a forward tilting of the trip board 16 by reason of its weighted forward portion. An automatic resetting of the trap is thus effected which is operated by the weight of the animal that has been caught therein, while the animal is securely retained in the trap after its first entry therein, and its death is provided for upon an attempt of the animal to escape.

While the form of the invention herein shown and described is what is believed to be the preferred embodiment thereof, it is nevertheless to be understood that minor changes may be made in the form, proportion, and details of construction without departing from the spirit and scope of the invention as set forth in the claims.

What I claim is:—

A trap comprising a catching casing having an exit opening in the top thereof, a drop door slidably mounted at the front thereof, a trip board pivoted within said casing, a lock arm forwardly positioned upon said board and adapted for projecting beneath said door when the latter is in its open position, a relatively larger casing, said last named casing having an entrance opening adjacent the top thereof, a passageway between the openings of said casings, a liquid container within said casing, a bail arm pivoted to the upper edge of the front wall, a flexible connection between the outer end of the bail arm and the upper end of the drop door, a platform rigidly secured within the larger casing adjacent the upper edge of the front wall thereof, said bail having its ends curved and positioned beneath the platform and extending within the larger casing beyond its pivot point and terminating adjacent the inner edge of the platform, and a tilting platform secured to the inner bent ends of the bail arm normally lying in a plane continuous with the rigid platform, the connection between the bail ends and tilting platform adapted to be moved relative to the inner edge of the rigid platform to afford a space between the meeting edges of the platforms when the drop door is held elevated.

In testimony whereof I affix my signature in presence of two witnesses.

SILVESTER ONYSKOW.

Witnesses:
 PAUL ROGULJA,
 GERGE STARCEVIC.